Figure 2:
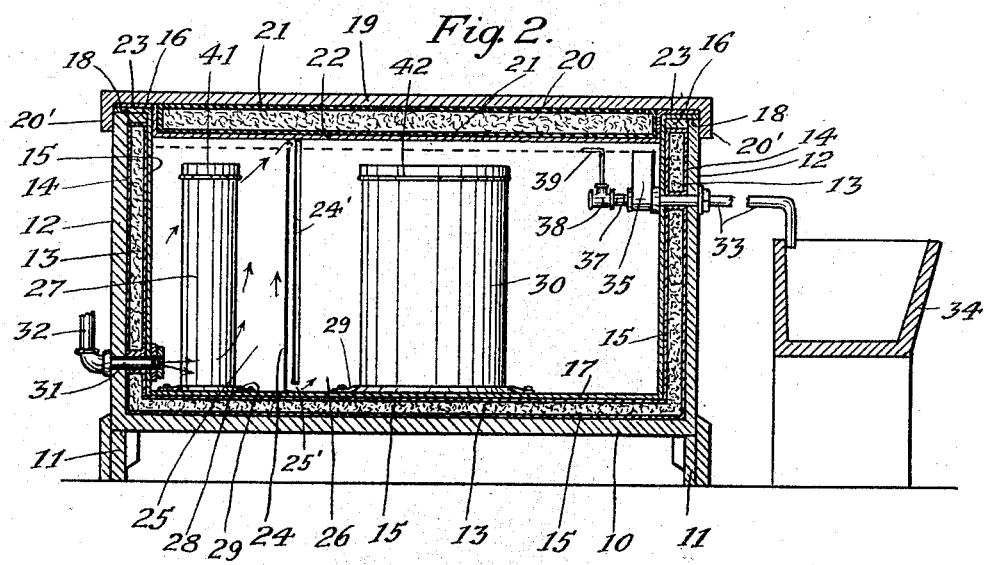

G. A. MILLER.
CREAM BOX.
APPLICATION FILED DEC. 19, 1912.

1,237,363.

Patented Aug. 21, 1917.

Witnesses:
Theo. Lageard.
H. A. Bowman.

Inventor:
George A. Miller.
By F. A. Whiteley.
his Attorney.

UNITED STATES PATENT OFFICE.

GEORGE A. MILLER, OF COLUMBIA HEIGHTS, MINNESOTA.

CREAM-BOX.

1,237,363. Specification of Letters Patent. Patented Aug. 21, 1917.

Application filed December 19, 1912. Serial No. 737,651.

*To all whom it may concern:*

Be it known that I, GEORGE A. MILLER, a citizen of the United States, residing at Columbia Heights, in the county of Anoka and State of Minnesota, have invented certain new and useful Improvements in Cream-Boxes, of which the following is a specification.

My invention relates to a cream box or means for storing and cooling cream, and has for its object to provide a device for such purpose which may be used by the ordinary farmer who has a limited water supply from a single well and for whom ice is not available.

In the present practice of handling cream it is customary for the farmer to separate the cream and milk with a hand separator immediately at the time of milking and before cooling the milk. The skimmed milk is then fed to calves or pigs and the cream stored until a sufficient quantity is obtained to warrant conveying the same to the creamery where the cream is actually used. Under conditions which quite generally prevail at the present time the farmer cannot afford to make trips to the creamery oftener than once in two or three days. The result is that stale and decomposed cream is necessarily mixed with good cream unless refrigerating means are available for cooling the cream quickly after separation and for keeping it comparatively cool until removal to the creamery. Of course in large dairy establishments where refrigerating plants or abundance of ice is available, or in instances where spring water in large quantities may be had, little difficulty is experienced in properly keeping the separated cream. But in the instances above enumerated the dairy is more than likely to be large enough so that cream deliveries can be made at practically every milking any way, so that the problem of keeping the separated cream is never serious. But for the multitude of small farmers located far from supplies of ice, and usually with but a single well having a supply of water so limited that it cannot be safely wasted, the matter of cooling and preserving cream until a sufficient quantity is accumulated for profitable delivery to the creamery is a matter of very great concern, and my invention has in view meeting the needs of this class of user.

The full objects and advantages of my invention will appear in connection with the detailed description thereof and are particularly pointed out in the claims.

Figure 1:
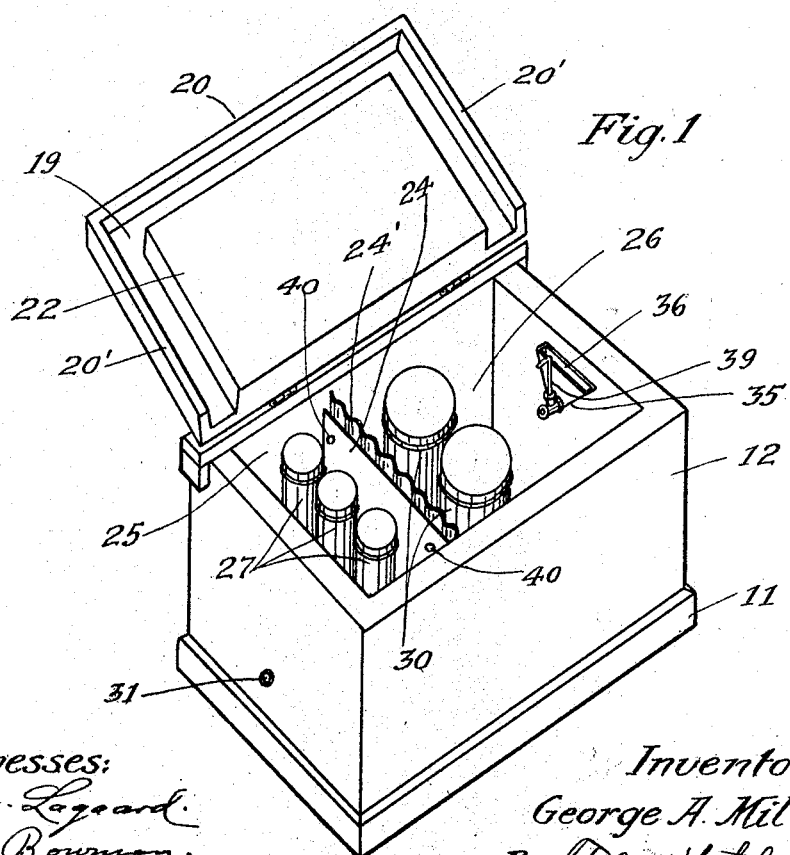

In the drawings illustrating the application of my invention in one form:

Figure 1 is a perspective view of a cream box embodying my invention. Fig. 2 is a longitudinal sectional elevation of the same.

My cream box has in view the provision of a thoroughly insulated separate chamber for water combined with means for conducting water through the same and causing it to circulate and taking off the warmest layers of water while the cream is being cooled, leaving the cooler water within the chamber. To this end I provide a box having a bottom 10 supported upon a base 11 and having side walls 12 formed of pine, oak or other lumber. Within the box 12 I provide a specially prepared layer of insulating material 13 overlying the floor 10 and inside of the walls 12. This insulating material may consist of any of the various felt insulations, lithboard made of mineral wool and flax fiber being especially desirable for the purpose. Before being set in the cream box this insulating material is covered inside and out with heavy coats 14 and 15 of some waterproof cement, thus preventing the absorbing of moisture in the insulation and consequent deterioration and ultimate destruction of its insulating properties. Above the strips of side insulation, cap pieces 16 are secured to upper edges of walls 12, and within the box outside of the insulation is set a tank 17 of galvanized iron or other desirable metal having a flange 18 extending back over the cap 16 and edges of side walls 12. A cover 19 is hinged to the box, said cover being provided with depending side flanges 20' extending about the rim of the box at the top of walls 12 when the cover is closed. A layer of insulating material 20 of the same character as that employed in the walls and bottom, and being covered with layers 21 of waterproof paint, is applied to the inside of the cover so as to project within the interior of the box when the cover is closed. A sheet metal cap piece 22 is secured over the layer of insulation 20, having flanges 23 thereof extending upwardly and outwardly directly beneath the wooden part 19 of the cover so that when the cover is closed the flange 23 will be in contact with flange 18. Within the interior of the cream box and at a point between one-third and one-fourth of the distance from one end to the other is a partition 24 extending to a point near the top of the space within the box and separating the water chamber within the box into a small compartment 25 and a large compartment 26. This partition is preferably of sheet metal, such as galvanized iron, and is soldered securely to the sides and bottom of the interior of the cream box. A second partition 24' which, as clearly indicated in Fig. 1, is formed with a series of vertical corrugations, is secured at its side edges to the sides of the interior of chamber 26, the bottom of said partition 24' being spaced from the bottom of said chamber, as indicated at 25', while the top extends somewhat above the top edge of partition 24.

Within the small compartment a series of tubular cans 27 are secured in position by flanges 28 on the bottoms of said cans taking under clips 29 secured to the floor of the chamber 25, there being three such clips for each can, so that the flange 28 may be inserted beneath the three clips from one side thereof. This holds the cans fixed in position at the bottom and at the same time makes it practicable easily to release the same. The cans are of small diameter and extend to a point a little short of the top of partition 24, each can being adapted to hold approximately one gallon of cream. Much larger cans 30 are secured within the larger chamber 26 by similar means to that employed for securing cans 27. A pipe 31 opens into chamber 25 near the bottom thereof, through which water is pumped into chamber 25 from a pipe 32 connecting with the usual pump extending into a well. Extending through the end wall so as to enter chamber 26 is an out-flow pipe 33 which may discharge into a water tank 34. The pipe 33 has secured to the inner end thereof a funnel 35 having two flat sides and an expanded top opening 36 in a horizontal plane slightly above the top of partition 24. The extension 37 of pipe 33 has therein a valve 38 controlled by a hand lever 39 extending above the water line in the tank by which pipe 33 may be opened through extension 37 to lower the level of the water in the tank so that the cans may be removed without wetting the hand of the operator. Apertures 40 in the partition 24 at the proper level therein permit lowering of level in chamber 25 at the same time that the level is lowered in chamber 26. The pipe 31 is located at practically the level of the floor of chamber 25.

The operation of my cream tank will be apparent. The freshly separated cream will be put into the narrow cans 27 within chamber 25, water will then be pumped from the well entering chamber 25 through pipe 31. This is cold water and by reason of the partition 24 it will be caused to circulate up and around the cans 27, as shown by the arrows, passing up over partition 24, thereafter going down between partitions 24 and 24' and entering chamber 26 beneath partition 24' at the point 25' near the bottom thereof, as indicated by the arrows. The top layers of warmer water will be drawn off through the expanded opening 36 of the flat-sided funnel 35, passing through pipe 33 to the watering trough 34 where the water is used for the farm stock. As the pumping is continued the cold water from pipe 31 is caused to continually flow about the tall, narrow cans 27, rapidly cooling the fresh warm cream therein, the warmest water always being drawn off through funnel 35. By the time a sufficient quantity of water for watering the stock has been pumped through the cream box the cream cans 27 will have been cooled to the temperature of the incoming water, which in cases of spring wells may be from 45° to 55°. The cover 19 is then closed, and owing to the effective insulation of the cream box the water and cream therein will be kept at substantially uniform temperature. At the time of the next milking when the cream is separated, the water will first be drawn off by means of valve 38 and hand lever 39, so that the tops of the cans are exposed. The old cream in cans 27 will then be poured into the storage cans 30, and cans 27 filled with freshly separated cream, after which water will again be pumped through the cream box until the fresh cream is thoroughly cooled and the cover closed so that the low temperature within the box will be maintained.

By means of the cream box above described any farmer who has a well in which the temperature of the water is not higher than 60° may, at practically no expense, and without wasting any of the water in his well, keep cream sweet and pure for periods up to four days. The cans 27 and 30 are covered with closures 41 and 42 so that said cans may be entirely immersed in the water. These closures are of a well known type over-lapping the upper rim of the can and providing communication of the inside of the can with the surface of the water within the closure for absorption of vapors from the milk. The insulation of this cream box while cheaply constructed is such as absolutely to insure freedom from absorption of moisture while at the same time providing a very complete and effective insulation for the walls of the cream box. I have shown three small cans 27 in chamber 25 and two of the larger cans 30 in chamber 26. It is obvious that the cream box may be constructed to hold a greater number of each set of cans, but in practice the small cans should be very small in diameter so as not to hold in excess of a gallon of cream, thereby insuring ripid cooling while the water is being pumped through the cream box.

I claim:

1. A cream box comprising insulated walls and cover, a partition dividing said box into a first and a second chamber, means for introducing water at the bottom of said first chamber, means for discharging the water from the top of the first chamber into the bottom of the second chamber, means for permitting the water from the top of said second chamber to be discharged outside said box, a valve controlled outlet pipe located inside of and below the top of said second chamber, the lever of said valve extending to the top of said second chamber, and small openings in said partition on the same level as said outlet pipe whereby when said valve is opened water may be drawn from the top of both chambers.

2. A cream box comprising insulated walls and cover, a partition extending from the cover to the floor so as to divide the interior into two chambers of uniform depth, one of said chambers being relatively narrow and small compared with the other chamber, a series of cans of small diameter in the narrow chamber, a series of storage cans in the large chamber, means for introducing water at the bottom of the small chamber, means for withdrawing the water from near the top of the small chamber and introducing it at the bottom of the large chamber, and means for withdrawing water from the top only of the large chamber.

In testimony whereof I affix my signature in presence of two witnesses.

GEORGE A. MILLER.

Witnesses:
F. A. WHITELEY,
H. A. BOWMAN.

Copies of this patent may be obtained for five cents each, by addressing the "Commissioner of Patents, Washington, D. C."